United States Patent
Spangler

(10) Patent No.: US 6,712,069 B1
(45) Date of Patent: Mar. 30, 2004

(54) SOLAR ENERGY COLLECTION AND STORAGE SYSTEM

(76) Inventor: William L. Spangler, 2110 Pope Ave., South Daytona, FL (US) 32219

( * ) Notice: Subject to any disclaimer, the term of this patent is extended or adjusted under 35 U.S.C. 154(b) by 0 days.

(21) Appl. No.: 10/299,820

(22) Filed: Nov. 20, 2002

(51) Int. Cl.$^7$ .................................................. F24J 2/04
(52) U.S. Cl. ........................ 126/641; 126/634; 126/704
(58) Field of Search ................................ 126/641, 634, 126/704, 708

(56) References Cited

U.S. PATENT DOCUMENTS

| | | | |
|---|---|---|---|
| 4,151,828 A | | 5/1979 | Mather et al. |
| 4,253,445 A | * | 3/1981 | Wilson ........................ 126/589 |
| 4,397,294 A | * | 8/1983 | Mancebo .................... 126/597 |
| 4,401,100 A | * | 8/1983 | Slater et al. ............. 126/362.1 |
| 4,409,964 A | | 10/1983 | Shimada et al. |
| 4,413,616 A | | 11/1983 | Tonomura et al. |
| 4,483,320 A | * | 11/1984 | Wetzel et al. ................ 126/584 |
| 4,574,779 A | * | 3/1986 | Hayes ........................ 126/641 |
| 4,649,903 A | | 3/1987 | Takeuchi et al. |
| 4,674,478 A | | 6/1987 | Liebard |
| 4,886,048 A | | 12/1989 | Labaton et al. |
| 5,555,878 A | | 9/1996 | Sparkman |
| 5,596,981 A | * | 1/1997 | Soucy ........................ 126/704 |

FOREIGN PATENT DOCUMENTS

| | | |
|---|---|---|
| JP | 55-7951 | 1/1980 |
| JP | 57-104050 | 6/1982 |
| JP | 58-164947 | 9/1983 |

* cited by examiner

*Primary Examiner*—Alfred Basichas
(74) *Attorney, Agent, or Firm*—Richard C. Litman

(57) ABSTRACT

A solar energy collection and storage system uses the radiation from the sun to heat a liquid in a collector and uses an enclosure with a vacuum to contain the collector, pump, pipes and storage tank to provide maximum insulation and minimum heat loss. Also, the vacuum within the enclosure is continuously maintained by a vacuum pump. A heat exchanger is included inside the storage tank. The heat exchange is connected by pipes with an external pump to an external hot water heater, heat pump or boiler which is outside the enclosure. The heat exchanger and external hot water heater would use water as is common to transfer the heat or energy to a location outside the enclosure.

19 Claims, 1 Drawing Sheet

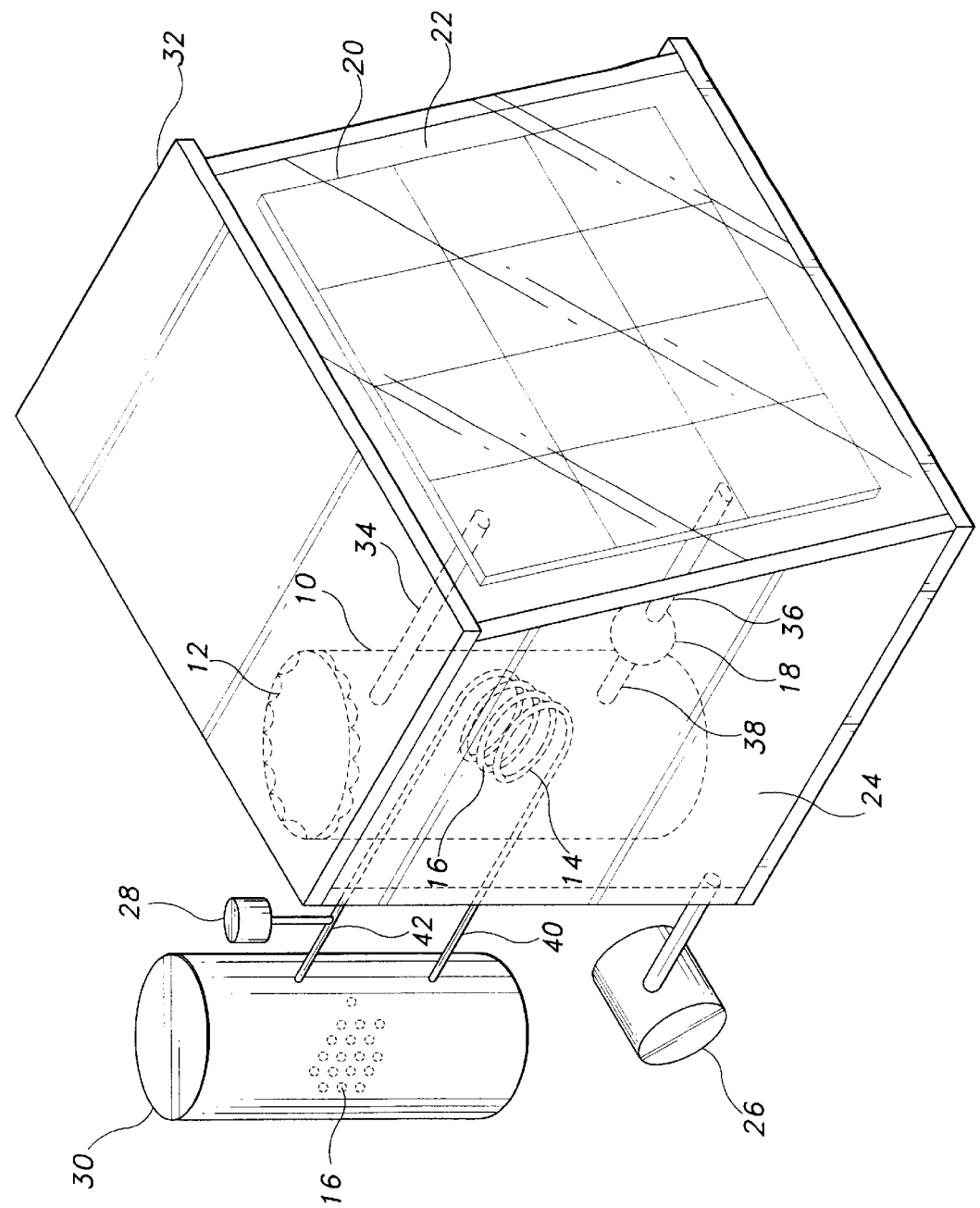

SOLAR ENERGY COLLECTION AND STORAGE SYSTEM

BACKGROUND OF THE INVENTION

1. Field of the Invention

The present invention relates to a solar energy collection and storage systems that use the radiation from the sun to heat a liquid, and that use a vacuum enclosure to contain the collector, pump, pipes and storage tank to provide maximum insulation, minimum heat loss and maximum heat collection.

2. Description of the Related Art

Many solar energy collection and storage systems have only an evacuated vacuum space between a jacket and a collection tube of the system. Devices of this type are shown in U.S. Pat. No. 4,151,828 to Mather et al issued on May 1, 1979; U.S. Pat. No. 4,409,964 to Shimada et al issued on Oct. 18, 1983; U.S. Pat. No. 4,413,616 to Tonomura et al issued on Nov. 8, 1983; U.S. Pat. No. 4,649,903 to Takeuchi et al issued on Mar. 17, 1987; U.S. Pat. No. 4,674,478 to Liebard issued on Jun. 23, 1987; U.S. Pat. No. 4,886,048 to Labaton et al issued on Dec. 12, 1989; U.S. Pat. No. 5,555,878 to Sparkman issued on Sep. 17, 1996; Japan patent 55-7951 issued on January 1980; Japan patent 57-104050 issued on June 1982; and Japan patent 58-164947 issued on September 1983. These devices use only an evacuated space between a jacket and collection tube with no vacuum pump to support a continuous vacuum.

Other solar energy collection and storage systems such as: U.S. Pat. No. 4,253,445 to Wilson issued Mar. 3, 1981 and U.S. Pat. No. 4,281,637 to Wilson issued Aug. 4, 1981 include a vacuum pump for the collection tube and jacket, but not for the pump, pipes and storage tank.

It would be desirable to have a solar energy generation or storage system that uses the radiation from the sun to heat a liquid in a collector and that uses a vacuum enclosure to contain the collector, pump, pipes and storage tank to provide maximum insulation and minimum heat loss for those system components and uses a vacuum pump to ensure that the enclosure continues to have a vacuum.

None of the above inventions and patents, taken either singularly or in combination, is seen to describe the instant invention as claimed. Thus, a solar energy collection and storage system solving the aforementioned problems is desired.

SUMMARY OF THE INVENTION

The present invention is a solar energy collection and storage system that uses the radiation from the sun to heat a liquid in a collector and that uses an enclosure with a vacuum to contain the collector, pump, pipes and storage tank to provide maximum insulation, maximum heat or energy collection and minimum heat loss. Also, the vacuum inside the enclosure is continuously maintained by a vacuum pump. Because of the maximum insulation and minimum heat loss provided by the vacuum in the enclosure, the radiated heat collected, pumped and stored is expected to be so high that the liquid used has to be one that has a much higher boiling point than water. One such liquid is oil. A heat exchanger is included inside the storage tank. The heat exchanger is connected by pipes with an external pump to an external hot water heater, heat pump, steam turbine or boiler which is outside the enclosure. The heat exchanger and external hot water heater use water as is common to transfer the heat to a location outside the enclosure of the system of the present invention.

Accordingly, it is a principal object of the invention to provide a solar energy collection and storage system having much greater efficiency than the prior art.

It is another object of the invention to provide a solar energy collection and storage system having almost all the system components enclosed in an enclosure having a vacuum provided by a vacuum pump.

It is a further object of the invention to provide a solar energy collection and storage system where almost all the system components are insulated by a vacuum to allow minimum heat loss and maximum insulation.

Still another object of the invention is to provide a vacuum insulated enclosure for a solar energy collection and storage system which ensures against a lost vacuum through the use of a vacuum pump and tight seals.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The sole drawing FIGURE is an environmental, perspective view of a solar energy collection and storage system according to the present invention.

Similar reference characters denote corresponding features consistently throughout the attached drawings.

DETAILED DESCRIPTION OF THE PREFERRED EMBODIMENTS

The present invention as shown in FIG. 1 discloses a solar energy collection and storage system having an enclosure 32 with six walls that are tightly enough joined and sealed to contain a vacuum 24. The insides of the five walls are all colored black. The sixth wall 22 is glass with the highest possible transparency. The glass wall 22 is fastened and sealed tightly enough to the other five walls in order to contain the vacuum 24. Generally, the enclosure 32 is a five foot by one foot rectangular three-dimensional structure.

Contained within the enclosure 32 is the rectangular collector 20. The collector 20 is mounted so that its face is completely parallel to the glass wall 22. The collector 20 contains the liquid 12 to be heated by the radiant energy from the sun. The storage tank 10 and the pump 18 are also contained with the enclosure 32. In addition, contained within the enclosure 32 are a pipe 34 connected between the collector 20 and the tank 10; a pipe 36 connected between the collector 20 and the pump 18; and a pipe 38 connected between the pump 18 and the storage tank 10. Also, a heat exchanger 14 is contained within the storage tank 10.

A vacuum pump 26 is connected externally to the enclosure 32 to continuously maintain the highest possible vacuum 24. Such a high vacuum 24 provides so much insulation that the amount of radiated heat from the sun that is captured by the liquid 12 in the collector 20 during a sunny day is expected to be as high as 3000 degrees Fahrenheit. This figure is based on the amount of energy the sun provides to the earth surface per square meter.

Circulating within the closed loop system of the collector 20; pipes 34, 36, 38; pump 18 and storage tank 10 is the liquid 12. The liquid 12 is heated by the radiant energy of the sun that hits the collector 20 and is stored in the storage tank 10. The liquid 12 used is one that can withstand a higher amount of heat before boiling than just water. One such known liquid 12 that can be used is oil which boils at 1000 degrees Fahrenheit. Other liquids 12 that boil above 3000 degrees Fahrenheit may be found and used to further increase the efficiency of the system. A boiling liquid would be too difficult to collect, store and maintain in this kind of system.

Because of the high temperatures of the liquid 12 in the closed loop system consisting of collector 20, pipe 34, tank 10, pipe 38, pump 18, and pipe 36, special materials and designs for the tank 10 and pump 18 will be required. The pump 18 and tank 10 maybe made of stainless steel or titanium. The tank 18 maybe made as a one piece unit. The pump 18 made of stainless steel may require magnets.

The system within the enclosure 32 maintained with a vacuum 24 by vacuum pump 26, consisting of collector 20, pipe 34, tank 10, pipe 38, pump 36 and pipe 36, collects solar energy radiated by the sun and stores it for later use by heat exchanger 14. The liquid 12 in the storage tank 10 is circulated by pump 18 to the collector 20 to increase its temperature. Once the temperature of liquid 12 reaches a desired temperature threshold, the heat exchanger 14 is activated in the storage tank 10 to heat another liquid 16 where it may be pumped by pump 28 through pipes 40, 42 to power a steam turbine, hot water heater, boiler or other heat engine. The activation of the heat exchanger 14 may be done manually or automatically by a valve or pump 28 dependent on a temperature gauge or a sensor in tank 10.

The heat exchanger 14 transfers heat from the liquid (oil) 12 stored in the internal storage tank 10 and provides it to a boiler or hot water heater to provide heat to the external area to be heated. The heat exchanger 14 may be connected to other thermal energy conversion devices to provide other forms of power such as motion or cooling. Heat exchanger 14 may have water as a liquid 16 to transfer the energy via pipes 40, 42 to the external boiler, hot water heater or other thermal energy conversion device 30. External pump 28 circulates the water 16 to an external boiler, hot water heater or other thermal energy conversion device 30. Therefore, the only connection to the outside not having vacuum insulation 24 is through pump 28 and pipes 40, 42 that connect to an external heat engine 30.

It is to be understood that the present invention is not limited to the embodiments described above, but encompasses any and all embodiments within the scope of the following claims.

I claim:

1. A solar energy collection and storage system comprising:
    a three dimensional enclosure having at least one glass wall facing the sun for admitting sunlight,
    a solar collector having a position behind said at least one glass wall contained within said enclosure for collecting radiant energy from the sun,
    a first pump contained within said enclosure,
    a storage tank contained within said enclosure,
    first pipes connecting said solar collector, said first pump and said storage tank contained within said enclosure creating a first closed loop system for a first liquid to flow within,
    a vacuum pump connected to said enclosure providing said enclosure with a vacuum,
    second pipes and a heat exchanger contained within said storage tank connected to said second pipes,
    said second pipes and a second pump connecting said heat exchanger to a heat energy device that is external to said three dimensional enclosure creating a second closed loop wherein heat stored in said storage tank and collected from said collector is transferred to said heat energy device via said second pipes and said second pump by a second liquid.

2. A solar energy collection and storage system as claimed in claim 1 wherein said first liquid used in said first closed loop has a boiling point that is higher than an amount of heat collected by said collector.

3. A solar energy collection and storage system as claimed in claim 2, wherein said first liquid is oil.

4. A solar energy collection and storage system as claimed in claim 3, wherein said heat energy device is configured to activate when a temperature in said storage tank reaches a predetermined threshold temperature.

5. A solar energy collection and storage system as claimed in claim 2, wherein said second liquid used in said second closed loop has a boiling point that is lower than an amount of heat collected by said collector.

6. A solar energy collection and storage system as claimed in claim 5, wherein said heat energy device is configured to activate when a temperature in said storage tank reaches a predetermined threshold temperature.

7. A solar energy collection and storage system as claimed in claim 2, wherein said heat energy device is configured to activate when a temperature in said storage tank reaches a predetermined threshold temperature.

8. A solar energy collection and storage system as claimed in claim 1, wherein said second liquid used in said second closed loop has a boiling point that is lower than an amount of heat collected by said collector.

9. A solar energy collection and storage system as claimed in claim 8, wherein said heat energy device is configured to activate when a temperature in said storage tank reaches a predetermined threshold temperature.

10. A solar energy collection and storage system as claimed in claim 8, wherein said second liquid used in said second closed loop is water.

11. A solar energy collection and storage system as claimed in claim 8, wherein said second liquid used in said second closed loop is water.

12. A solar energy collection and storage system as claimed in claim 11, wherein said heat energy device is a turbine.

13. A solar energy collection and storage system as claimed in claim 12, wherein said steam turbine is configured to activate when a temperature in said storage tank reaches a predetermined threshold temperature.

14. A solar energy collection and storage system as claimed in claim 1, wherein said second liquid used in said second closed loop has a boiling point that is lower than an amount of heat collected by said collector.

15. A solar energy collection and storage system as claimed in claim 14, wherein said heat energy device is configured to activate when a temperature in said storage tank reaches a predetermined threshold temperature.

16. A solar energy collection and storage system as claimed in claim 14, wherein said second liquid used in said second closed loop is water.

17. A solar energy collection and storage system as claimed in claim 16, wherein said heat energy device is a boiler.

18. A solar energy collection and storage system as claimed in claim 14, wherein said heat energy device is a boiler.

19. A solar energy collection and storage system as claimed in claim 14, wherein said heat energy device is a turbine.

* * * * *